R. S. CASSADY.
DUMP BODY MOTOR TRUCK.
APPLICATION FILED MAR. 4, 1912.
1,037,126.
Patented Aug. 27, 1912.
2 SHEETS—SHEET 1.
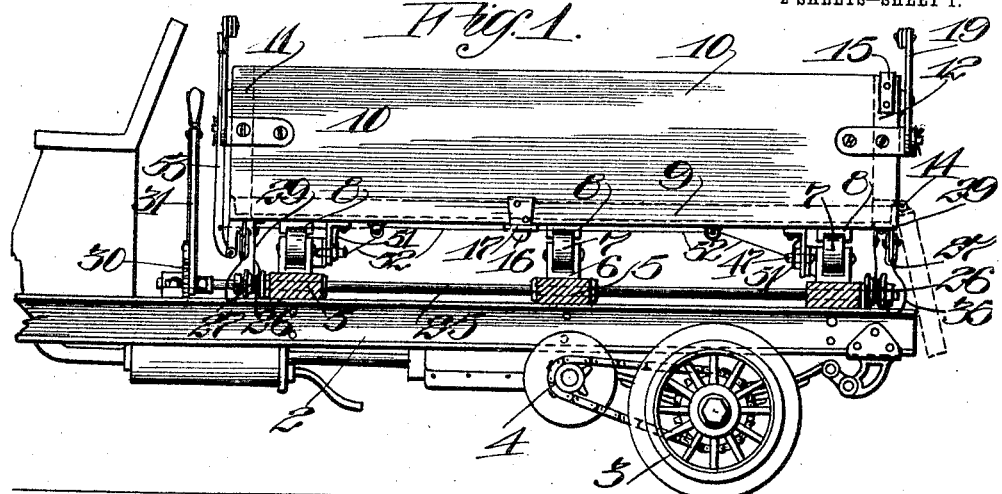
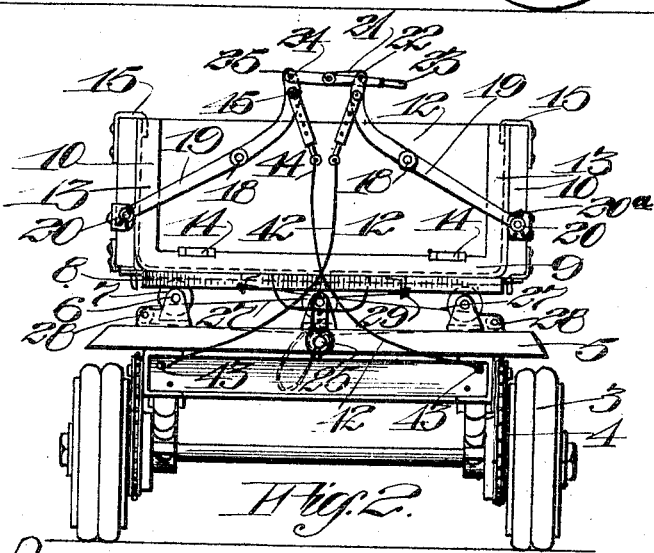
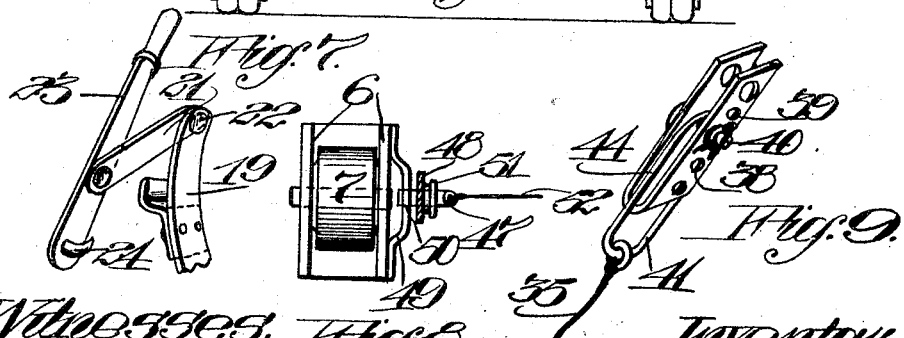
Witnesses.
Thos. Lashberg.
F. E. Maynard.
Inventor.
Robert S. Cassady.
by G. H. Strong.
his atty.

R. S. CASSADY.
DUMP BODY MOTOR TRUCK.
APPLICATION FILED MAR. 4, 1912.
1,037,126.
Patented Aug. 27, 1912.
2 SHEETS—SHEET 2.
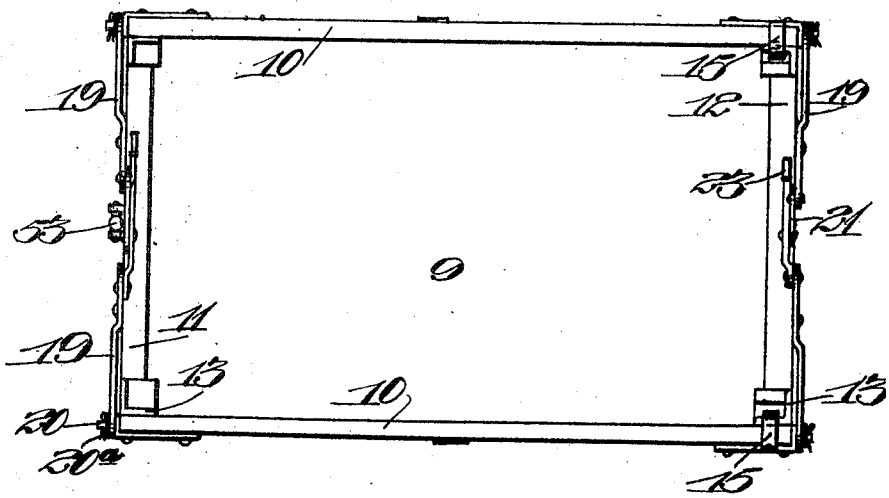
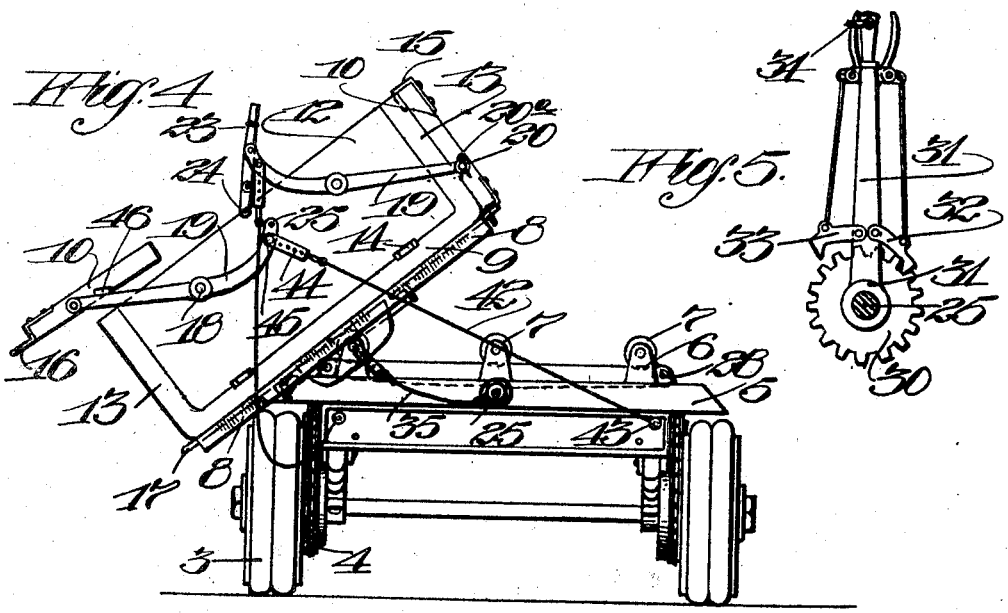

UNITED STATES PATENT OFFICE.

ROBERT S. CASSADY, OF ALAMEDA, CALIFORNIA.

DUMP-BODY MOTOR-TRUCK.

1,037,126.  Specification of Letters Patent.  Patented Aug. 27, 1912.

Application filed March 4, 1912. Serial No. 681,542.

*To all whom it may concern:*

Be it known that I, ROBERT S. CASSADY, a citizen of the United States, residing at Alameda, in the county of Alameda and State of California, have invented new and useful Improvements in Dump-Body Motor-Trucks, of which the following is a specification—

This invention relates to motor trucks, and particularly to an improved dumping body for such trucks.

The object of the present invention is to provide a substantial, capacious body for trucks in combination with means whereby the body may be shifted laterally to either side of the truck and adjusted in tipping position for the discharge of its contents.

A further object of the present invention is to provide means whereby the truck body may be manually operated; means being provided for locking the body in a centrally normal position upon the truck frame, and means being provided for automatically actuating the sides of the body when the latter is adjusted into the position to one or the other sides of the truck.

The invention consists of the parts and the construction and combination of parts as hereinafter more fully described and claimed, having reference to the accompanying drawings, in which—

Figure 1 is a side elevation partly broken away of a motor truck. Fig. 2 is an end view of the same with the dumping body in normal position. Fig. 3 is a plan view of the dumping body. Fig. 4 is an end view of the truck with the body adjusted in tilting position on one side. Fig. 5 is a detail showing the shaft operating ratchet. Fig. 6 is a detail view of the stay rope. Fig. 7 is a perspective view of the side door lever lock. Fig. 8 is a detail plan view of a body locking device. Fig. 9 is a perspective view of an adjustable connection for the tension ropes.

In the illustrated embodiment of my invention, 2 represents a portion of a suitable vehicle frame, having an appropriate running gear 3 to which power may be transmitted through a transmission mechanism 4. Transversely mounted upon the upper part of the truck frame 2 is a plurality of beams or members 5 upon which are mounted bearings 6 of which a suitable number is provided on each beam 5. In each bearing 6 is journaled a roller 7.

Resting upon the upper surfaces of the rollers 7 of each beam 5 is a series of tracks or tunnel irons 8, of suitable proportion, which are rigidly secured to the bottom 9 of a truck body formed by the sides 10 and a front gate 11 and a rear gate 12. The rear end of the body bottom 9 is shown as provided with a substantial binding or angle iron, as 13, to which are fastened hinges 14 of the rear or end gate 12. The upper rear ends of the sides 10 are provided with hooks 15 which are adapted to enter the upper ends of the angle or brace iron 13 by which the sides 10 are thus suspended. The lower edges of the sides 10 may be drawn snugly against the side edges of the bottom 9 by a suitable form of tongue 16 of which there is one on each side adapted to enter a corresponding tongue 17 secured to the adjacent portion of the bottom 9.

Both the forward end 11 and the rear end 12 of the body support at pivots 18 appropriately shaped levers 19, the outer ends of which are pivoted at 20 to the ends of the sides 10. The upper adjacent ends of the levers 19 may be locked together, when desired, by a toggle connection comprising a link 21 pivoted at 22 upon one of the upper ends of a lever 19. To the free end of the link 21 is pivoted a handle or lever 23, the handle having a slightly hooked-shaped prong 24 which is adapted to be inserted in a perforation 25 in the upper end of the adjacent lever, as clearly shown in Figs. 2 and 7.

The levers 19 on the rear end gate 12 may be disconnected from the sides 10 by removing cotter pins 20ª which may be inserted through the pivots 20 on the ends of the side members 10. When so released the levers 19 may swing downwardly with the gate 12 as this is moved about its hinges 14.

Extending longitudinally with the frame 2 and below the body structure, there is provided a shaft 25, which may be mounted in or on the members 5, and secured to which shaft is a number of drums 26 around each of which is wrapped a flexible connection 27, which is clearly shown in Fig. 2, then passing oppositely from the drums 26 outwardly toward guide sheaves 28 secured on the transverse members 5; the ends of the connections 27 then being carried inwardly beneath the truck and cross as shown and finally connected to opposed fastening devices 29.

At the forward end of the shaft 25 is provided a gear or ratchet wheel 30, Fig. 5. Adjacent to the ratchet wheel 30 and loosely mounted on the shaft 25 is an oscillatory lever 31 carrying pawls 32—33, one or the other of which may be held in inoperative position by a swivel ring or other suitable device 34 at the upper end of the lever 31. By means of the lever 31 and one or the other of pawls 32—33, the operator may ratchet the gear 30, thus revolving the shaft 25 which in turn winds the cables or connections 27 on the drums 26 so that one end of the cables will pull on the bottom 9 of the truck body so that the latter may be shifted toward that side of the truck over which it is desired to tilt the car body; the tilted position of the car body being indicated in Fig. 4.

As the operator through means of one of the pawls 32 revolves the shaft 25, and through the cables or connections 27 pulls the car body to one side of the truck frame 2, the other ends of the cables 27 will automatically play off the drums 26. As the dumping body approaches the side of the truck 2, the supporting rails or tracks 8 will run over the side rollers 7 and being unsupported at the outer portion the car body will tilt to the position indicated in Fig. 4 resting on the inclined ends of the transverse members 5 of the truck body.

To insure against too excessive a tilting action of the dumping body, there is provided a plurality of flexible stays 35 which are shown in detail in Fig. 6 as having at one end a ring or collar 36 which may swing freely around the shaft 25; the other end of the stay being connected by an adjustable or take-up device 37, such as shown in Fig. 9 as comprising a clevis 38, having a plurality of openings 39, through one of which may be inserted a pin or bolt 40 over which is passed a ring or loop 41 to which is secured the end of the flexible stay 35; the clevis 37 being secured to the bottom 9. When the car body has been tilted to the desired position over one side of the truck 2, the flexible stay or stop device 35 comes into action to limit the further angular tilting of the car body by reason of the connection of the latter through means of the stay 35 to the relatively stationary bar 25 of the vehicle.

When the vehicle is traveling with the dumping body 9 loaded and the sides 10 in appropriate adjusted position, the upper ends of the levers 19 are normally locked to prevent the accidental loosening of the sides, but at the time it is desired to dump the body the operator disconnects the toggle devices 21—23, thus releasing the adjacent levers, and as the car body is shifted to one or the other side of the truck frame 2 through the winding of the cables or connections 27, then that one of the levers 19 on the end gate 12 which is being moved outwardly away from the truck body 2 will draw tight a flexible connection or cable 42, one end of which is substantially connected to the truck frame, as at 43, to the other end of which is connected an adjustable clevis 44 which is pivoted at 45 in the upper end of a lever 19, there being one of the flexible tension ropes or connections 42 for each lever 19 at the forward and back ends of the truck body.

When the car body has reached a lateral position over one side of the truck frame 2 and starts to tilt downwardly about the outermost bearing rollers 7, the tilting action of the truck body draws tight the tension rope or connection 42 and this being limited at one end 43 by the truck frame pulls on the outermost lever 19 rocking it about its fulcrum 18, thus lifting the side 10 to which its lower end is connected and lifting the side to the position indicated in Fig. 4, thus permitting the discharge of the contents of the truck body entirely to one side of the frame 2.

By locating the pivots 20 in the ends of the sides 10 at a point below the longitudinal center line of the sides, this will cause the latter to tilt relative to the levers 19 to the position shown in Fig. 4, each end of the sides being provided with small stops 46 which will rest on the adjacent ends of the levers 19 when the side is lifted away from the body of the truck.

As the operator revolves the shaft 25 to wind the cables 27 over their respective drums and holds or shifts the car body back from an inclined to a horizontal position upon the several rollers 7, the car body will be automatically locked in its normally central position when this is approached by a suitable locking device comprising a bolt 47, of which there is a suitable number provided; the bolt being slidable in a suitable bearing 48 attached to the lower surface of the bottom 9 and being normally projected toward a keeper 49, which is shown in the present instance as attached to one of the bearings 6 of a roller 7, Fig. 8. The outer surface of the keeper 49 is curved convexly so that as the bolt 47 approaches from either side it will ride the surface of the keeper 49 until it registers with a perforation 50 therein when the bolt will automatically snap into the perforation under the force of a spring 51 attached to the bottom 9. The bolts are manually released from the keepers 49 by a suitable flexible connection 52 which passes forwardly and is connected to an operating lever 53 within reach of the operator of the vehicle. A pull on this lever withdraws the bolts 47 from the keepers 49 thus permitting the car body to be shifted laterally when desired.

Having thus described my invention, what I claim and desire to secure by Letters Patent is—

1. The combination with a traction frame having a plurality of transverse beams, of a laterally adjustable and tiltable box or body supported upon said transverse beams, adjustable sides for said body, means for attaching the same to the bottom of the body, an adjustable end gate for the body, levers mounted upon said end gate and detachably connected to the ends of the sides, whereby the levers may swing down with said gate, and connections between said levers and said traction frame whereby when the box or body is laterally adjusted and tilted over the side of said frame the lower side of the body will be automatically raised.

2. The combination with a traction frame having a plurality of transverse beams, of a laterally adjustable and tiltable box or body supported upon said transverse beams, adjustable sides for said body, means for attaching the same to the bottom of the body, an adjustable end gate for the body, levers mounted upon said end gate and detachably connected to the ends of the sides, whereby the levers may swing down with said gate, connections between said levers and said traction frame whereby when the box or body is laterally adjusted and tilted over the side of said frame the lower side of the body will be automatically raised, and means whereby said levers may be locked to prevent the opening of the sides of the car body.

In testimony whereof I have hereunto set my hand in the presence of two subscribing witnesses.

ROBERT S. CASSADY.

Witnesses:
   CHARLES EDELMAN,
   C. J. SWEISON.